United States Patent [19]
Traversat et al.

[11] Patent Number: 6,115,715
[45] Date of Patent: Sep. 5, 2000

[54] TRANSACTION MANAGEMENT IN A CONFIGURATION DATABASE

[75] Inventors: Bernard A. Traversat, San Francisco; Tom Saulpaugh, San Jose; Jeffrey A. Schmidt, Boulder Creek; Gregory L. Slaughter, Palo Alto, all of Calif.

[73] Assignee: Sun Microsystems, Inc., Palo Alto, Calif.

[21] Appl. No.: 09/107,043

[22] Filed: Jun. 29, 1998

[51] Int. Cl.[7] .................................................. G06F 15/00
[52] U.S. Cl. ........................................ 707/100; 707/104
[58] Field of Search .................................. 707/100, 102, 707/8, 200, 104; 345/347

[56] References Cited

U.S. PATENT DOCUMENTS

| | | | |
|---|---|---|---|
| 5,049,873 | 9/1991 | Robins et al. | 340/825.06 |
| 5,263,155 | 11/1993 | Wang | 707/8 |
| 5,459,862 | 10/1995 | Garliepp et al. | 707/8 |
| 5,537,642 | 7/1996 | Glowny et al. | 713/200 |
| 5,652,908 | 7/1997 | Douglas et al. | 714/4 |
| 5,706,453 | 1/1998 | Cheng et al. | 345/347 |
| 5,838,918 | 11/1998 | Prager et al. | 395/200.1 |
| 5,946,685 | 8/1999 | Cramer et al. | 707/10 |

FOREIGN PATENT DOCUMENTS

| | | | |
|---|---|---|---|
| 99/17203 | 4/1999 | WIPO | G06F 11/14 |

OTHER PUBLICATIONS

Kuck, "The structure of computers and computations", vol. 1, John Wiley & sons, pp. 339–343. 1978.

C.J. Date, "IMS Fast Path Databases," *An Introduction to Database Systems*, 3d Ed., IBM Corporation, p.380, 1981.

*Primary Examiner*—Hosain T. Alam
*Assistant Examiner*—Sanjiv Shah
*Attorney, Agent, or Firm*—Beyer Weaver & Thomas, LLP

[57] ABSTRACT

A method and system are disclosed for updating and managing a configuration database used to store configuration and user data in a computer network having multiple clients, such as network computers. The transaction management mechanisms described determine whether new data, such as a new user or specific property, is being added to the configuration database or whether an existing node in the database is being modified by a transaction. A locking mechanism obtains a lock on a node according to whether a new node is being added to the configuration database or an existing node is being modified. During this process, an identifier is assigned to the transaction that caused the lock that acts as a transaction handle. The transaction then proceeds to modify the configuration database by either adding new data or modifying existing data. The locking mechanism then commits the transaction by releasing the lock if the modification or insertion is successful, or aborts the transaction if the modification or insertion fails.

16 Claims, 9 Drawing Sheets

TRANSACTION MANAGEMENT IN A CONFIGURATION DATABASE

CROSS-REFERENCES TO RELATED APPLICATIONS

This application is related to U.S. patent application Ser. No. (not yet assigned), Application Ser. No. 60/085,425 filed on May 14, 1998, entitled "JAVA SYSTEM DATABASE," which is incorporated herein by reference.

BACKGROUND OF THE INVENTION

1. Field of the Invention

The present invention relates generally to computer software and computer network applications. More specifically, it relates to client configuration databases and managing transactions in a configuration database.

2. Discussion of Related Art

One type of conventional computer network involves connecting a series of personal computers referred to as clients (e.g., Sun SPARC workstations or IBM PCs), to one or more server computers. The client computers are generally self-sufficient and contain within their own memory much of the information needed to run user applications and perform network operations. That is, they contain information regarding their own configuration with regard to both software and hardware capabilities and requirements. The client computers typically access the network servers for a variety of reasons such as, for example, accessing network software applications, sending and receiving email, retrieving and storing information on a network database. However, information specific to a particular client computer generally resides on the client computer. This information can include, for example, the amount of memory or databus types, hardware specifications, such as what type of databus or additional processors. Since the client computers are relatively self-sufficient and store their own configuration information (and, thus is not available on the server computer), the task of data and application management on a client computer has become increasingly burdensome.

Although it is possible to propagate minor changes or fixes to applications that reside on a server on the network to the client computers, any significant upgrade or fix, or installation of a new application that effects every client requires that each client computer be accessed and updated individually by a network administrator. With the increasing number of computers being connected to networks ranging in the tens of thousands in some enterprises, the burden of installing major revisions or upgrades to application software or to general configuration software has become expensive, inefficient, and time-consuming.

Present configuration databases in distributed computing environments, particularly those that utilize network computers, lack adequate transaction management tools and features. For example, configuration database systems and protocols do not support fully functional locking capability to handle read-only transactions or exclusive transactions. Another feature lacking in such database systems and protocols as described above is what is referred to as atomicity, or the ability to guarantee that a transaction in the database was either fully completed or not completed. These features are important practical considerations in the day-to-day use of a configuration database. In addition, transactions in prior art configuration databases lack invisibility to the application; in other words, the application must explicitly identify the transaction and how the transaction should be performed. This is in contrast to simply specifying what needs to be done and allowing the configuration database to handle the transaction in the most efficient manner without intervention from the application.

Therefore, in the context of managing transactions in the configuration database, it would be desirable to have transaction management in a configuration database that allows for atomicity and locking. It would also be desirable to have a transaction management framework which behaves as a core base feature in that applications do not have to instruct or oversee the completion of the transaction, if it chooses not to do so. The application should simply indicate that it wants to complete a particular operation and that the configuration database should do whatever it believes is necessary to guarantee the atomicity of the operation.

SUMMARY OF THE INVENTION

To achieve the foregoing, and in accordance with the purpose of the present invention, a method of managing transactions and updating a configuration database is described. In one aspect of the invention, the transaction mechanism determines whether a new node is being added to the configuration database or an existing node is being modified by the transaction. A lock is obtained on the node according to whether a new node is being added to the configuration database or an existing node is being modified. An identifier or handle is assigned to the transaction that caused the lock, at which point the modifications are made to the configuration database. The transaction causing the modifications is committed by having the lock released if the modifications are successful. The transaction is aborted if the modifications fail.

In a preferred embodiment, the locking mechanism determines whether the transaction attempting to obtain the lock is a blocking or non-blocking transaction, which will determine whether the transaction's thread will be placed in a queue to wait for the lock to be released. In another preferred embodiment, a new node is added to the configuration database if data unrelated to an existing node is created by the transaction, and an existing node is updated if data created by the transaction is related to the existing node. In yet another preferred embodiment, if the transaction is aborted, the database is reverted to an initial state by counteracting all updates in the transaction that were successfully performed. This is followed by releasing the lock on the node and notifying an event manager that the lock has been released.

In another aspect of the invention, a system for managing transactions in a distributed configuration database having an initial state and multiple sub-trees is described. A transaction interface, having private and public segments, accepts transactions, initiated by an application, made to the configuration database. An event notification manager alerts transactions waiting for a lock to be released when a lock-holding transaction posts a message indicating that the lock has been released. An event queue stores data, categorized based on the transactions, relating to transactions made to the configuration database. The private segment of the transaction interface ensures that a transaction does not maintain a lock for a time longer than required by the transaction.

BRIEF DESCRIPTION OF THE DRAWINGS

The invention, together with further advantages thereof, may best be understood by reference of he following description taken in conjunction with the accompanying drawings in which.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

A data framework or schema and method of managing transactions directed to the data schema among computers in a computer network is described in the various drawings. The present invention discloses a hierarchy or data schema for representing and storing configuration information and related information in a system database. It also discloses ways to manage user transactions that update or modify data in the data schema. For the purposes of illustrating one embodiment of the present invention, a Java system database (JSD) is examined. In other preferred embodiments, the system database can operate on other types of platforms. The JSD of the described embodiment is a single subsystem that includes at least two major sub-components, or sub-schemas: the client schema and the server schema. In the described embodiment, data relating to a client is stored in a client schema that resides in the client memory. Configuration data for each of the clients is stored in a server schema which resides on a network server. The configuration information for each client, also referred to as subsystem, is stored in the server schema. This is in contrast to conventional networks where configuration information regarding a client is hardcoded or stored on the client machine. The data schema of the present invention allows a network administrator to manage configuration information for each of the computers in the network from a central repository such as a single server. Thus, any software updates, version upgrades, or installation of new applications that require knowledge of and access to a subsystem configuration can be implemented from the central repository and propagated to the individual clients. Users on the client machines will not have to exit applications and, moreover, the network does not have to be brought down for maintenance in order to install or propagate the new upgrade or version of the application.

Figure 1:
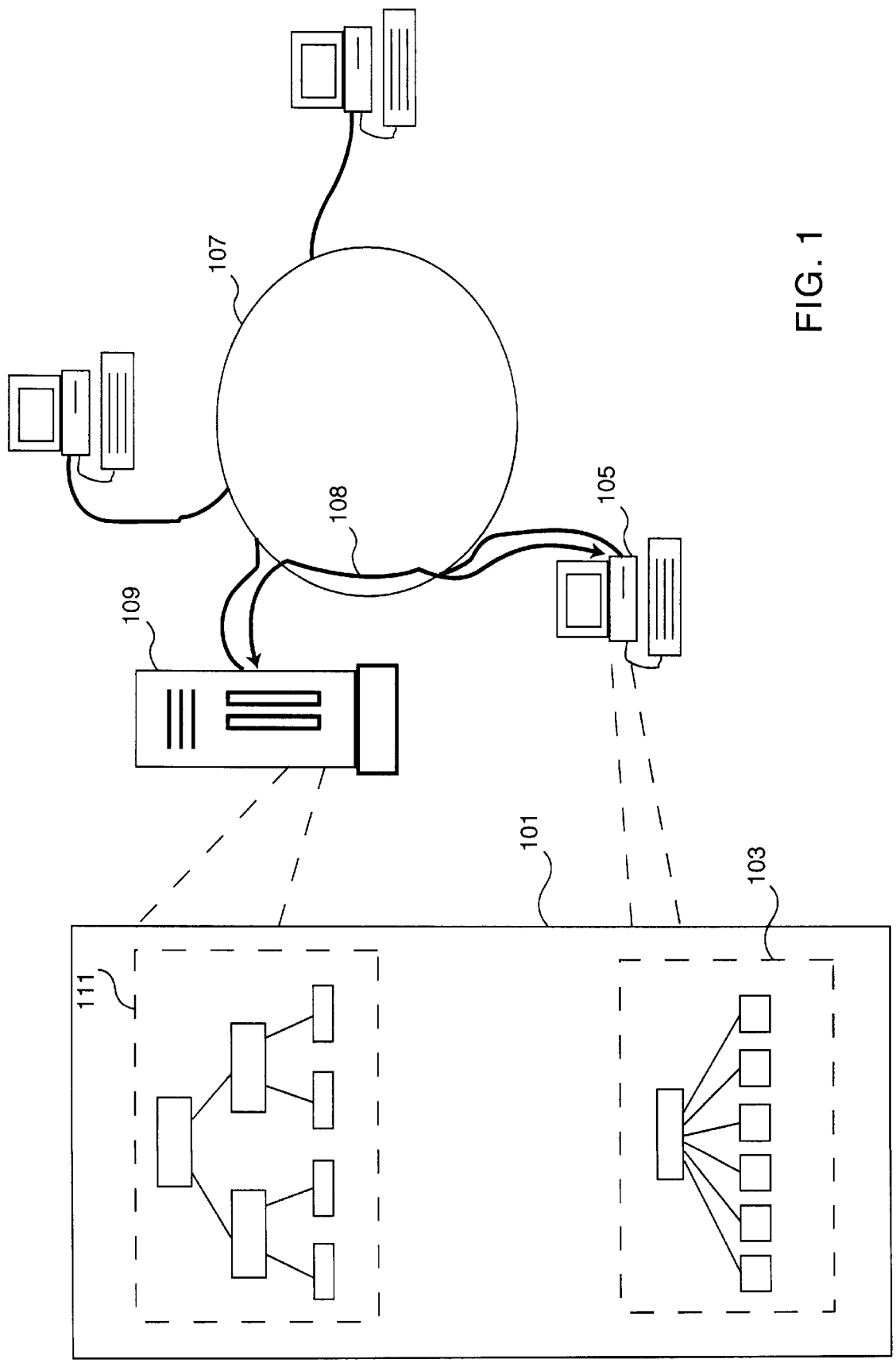
FIG. 1 is a block diagram showing components of a computer network configuration showing a system-wide data schema in accordance with one embodiment of the present invention.

FIG. 1 is a block diagram showing components of a computer network configuration showing a system-wide data schema in accordance with one embodiment of the present invention. In the described embodiment, the system-wide data schema is illustrated as a Java system database JSD (101) that consists of a client schema 103 which resides on a client machine 105 as part of network 107. A server schema 111 resides on a server computer 109 which is part of network 107.

Figure 2:
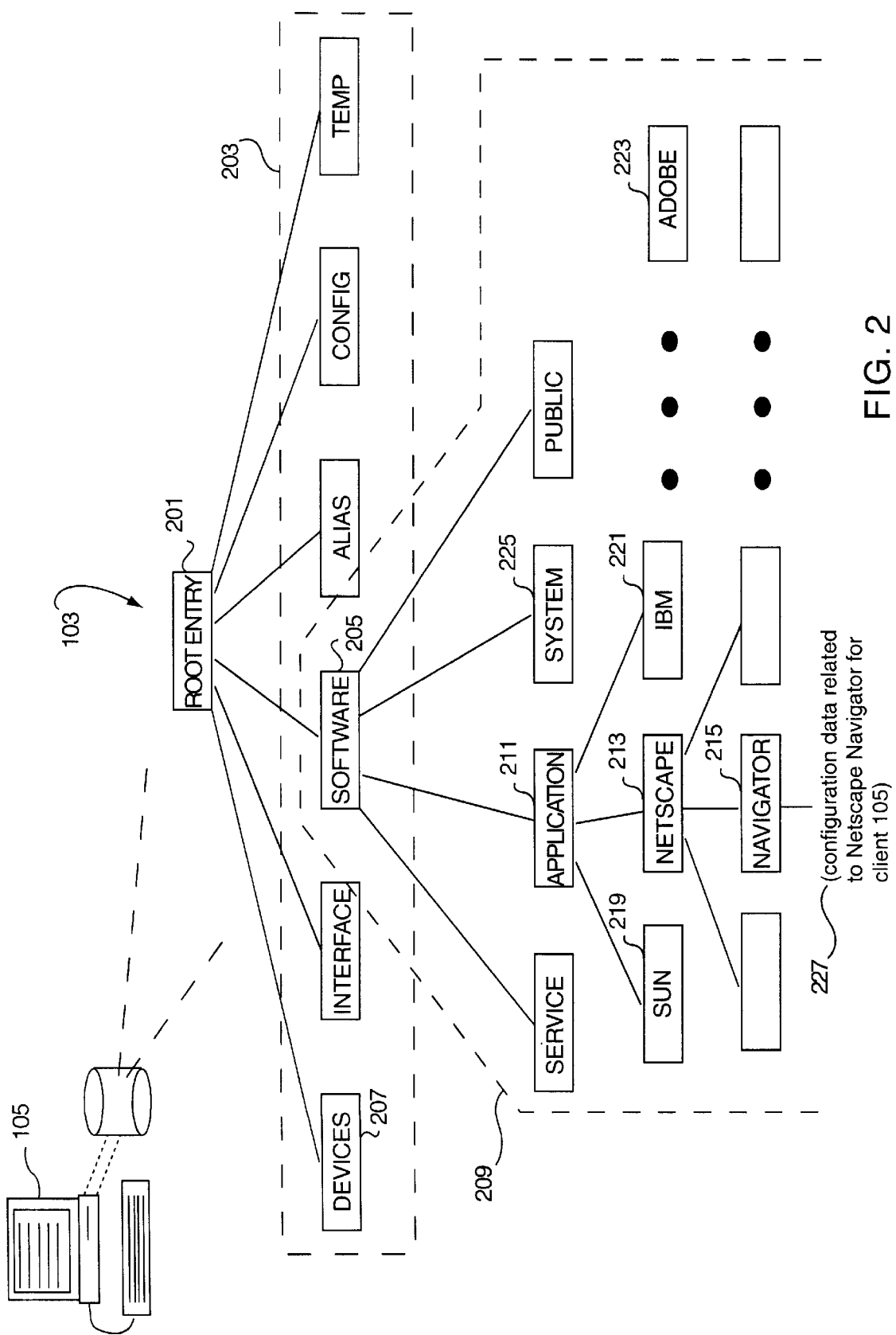
FIG. 2 is an illustration of an n-way tree structure representing client schema hierarchy in accordance with one embodiment of the present invention.

FIG. 2 is an illustration of an n-way tree structure representing client schema hierarchy 103 in accordance with one embodiment of the present invention. The hierarchy of client schema 103 as well as the hierarchy of server schema 111, is manifested using an n-way tree. At the root of the tree is a root entry 201 which does not contain any data and is the only node framework in the hierarchy that references itself. A first level of nodes 203 in client schema 103 collectively define individual namespaces in the generic client schema. The first level 203 in the hierarchy below root entry 201 and contains the namespace entries.

In the described embodiment, there are six namespaces in generic client schema 103. In other preferred embodiments, there may be more or fewer namespaces depending on the needs of a particular network configuration. In the described embodiment, the standard top level namespaces for the JSD client are SOFTWARE, DEVICE, INTERFACE, SOFTWARE CONFIGURATION, ALIAS, and TEMP. For example, the SOFTWARE namespace begins at node 205 and includes all nodes and data branching from node 205. The specific entries in layer 203 of the hierarchy are roots of sub-trees that define the unique namespaces. All entries in a particular namespace, such as SOFTWARE, are entries that relate to configuration data regarding software applications for client 105. Entries in the data schema of the present invention are made up of a unique name, a list of children (entries below the given entry) and a set of tuples. Each tuple contains a property name and associated property value. For example, in a word-processing program a property name can be "font" and the property value can be Palentino. Similarly, all entries under the DEVICE namespace 207 are entries that are related to configuration information of client machine 105 on which client schema 103 resides. Every entry in the hierarchy may act as both an entry in a sub-tree and the root of a sub-tree having descendent entries or children nodes.

As shown in FIG. 2, each entry in the tree has a single parent and can have several children nodes. A namespace such as SOFTWARE namespace 209 is a specially designated sub-tree that includes entries that relate to configuration data on software for a particular client such as client 105. As shown in FIG. 2 in the described embodiment, namespaces are always direct descendants of a root entry 201, also referred to as a super root. In other preferred embodiments, namespaces can be defined at other levels in the hierarchy and need not descend directly from root 201. The standard namespaces of the JSD schema client are created during the startup or booting procedure of the client computer. Each of the namespaces in the described embodiment are available in all implementations of the Java platform. The six namespaces are well known namespaces that are initialized by the Java platform. Other dynamically constructed namespaces can be added to the standard database namespaces after initialization.

Each namespace is managed by a default namespace manager. The namespace manager controls how the entries are stored and accessed within the namespace. The manager implements a standard interface that exports the security, storage, and ownership attributes of any entry in the namespace.

SOFTWARE namespace 209, for example, contains a list of installed and/or available system services such as device drivers, user applications, and user configuration information. The software namespace is the only namespace in the client schema persistent in that a server provides a backup store for all entries in this namespace. A persistent name space or entry as opposed to transient name space are entries that must be saved on a persistent storage location. An example of persistent entries are configuration information related to user environments that need to be stored on persistent storage. When a user logs on, the user's last saved environment needs to be retrieved so he or she does not have to reset the environment. Persistent entries are entries that can be saved and retrieved from a permanent storage location. Persistent and transient namespaces are staticly separated when namespaces are created. A persistent entry is not allowed to reside in a transient namespace and/or a transient entry is not allowed to reside in a persistent namespace. In the described embodiment, persistent entries are stored on a remote JSD server. In the described embodiment, under the SOFTWARE namespace there are four categories: application, system, service, and public. In the described embodiment, using the Java platform, some of the entries in the SOFTWARE namespace are arranged using Java-unique naming conventions and other non-Java related entries having naming conventions based on specific applications. In the described embodiment, company names such as IBM, Sun, or Lotus are given names such as com.IBM, com.Sun, and com.Lotus. These company names distinguish company-specific information. Entry names below the company entry are company-specific.

As described, the SOFTWARE namespace 209 is the only namespace of the six that has persistent storage in the described embodiment. The other namespaces such as DEVICE namespace 207 have transient storage. Entries in these namespaces are lost when the client computer is turned off. This is true in the described embodiment because the five transient namespaces store data that relates specifically to a client computer. In the described embodiment, the SOFTWARE namespace contains application configuration information which needs to be saved after the computer is turned off.

Under the software namespace are four categories: application, system, service and public. Using the application category as an example, an entry com.Netscape 213 contains the company-unique name (e.g., Netscape) and below com.Netscape entry 313 is an entry for one of Netscape's products Netscape Navigator. Under entry 215 is company-specific information 217 relating to Netscape Navigator.

Entries 219, 221 and 223 are entries for other vendors which will also have entries similar to entry 215. In the described embodiment, the structure of the device namespace 225 reflects some or all of the input/output bus or peripheral bus and the devices present on the client. In other words, the physical connectivity of buses and devices are represented as a tree of entries where a particular bus is the parent and leaf entries contain configuration data on the devices.

In the software namespace, the leaf node level of the hierarchy contains data 227 that is configuration specific and is arranged according to how the application, for example Netscape Navigator, wants to order the specific data in the leaf node level. For a word-processing application, the leaf node entries would contain specific information such as font, dictionary definitions, and other word-processing type configuration data.

Figure 3:
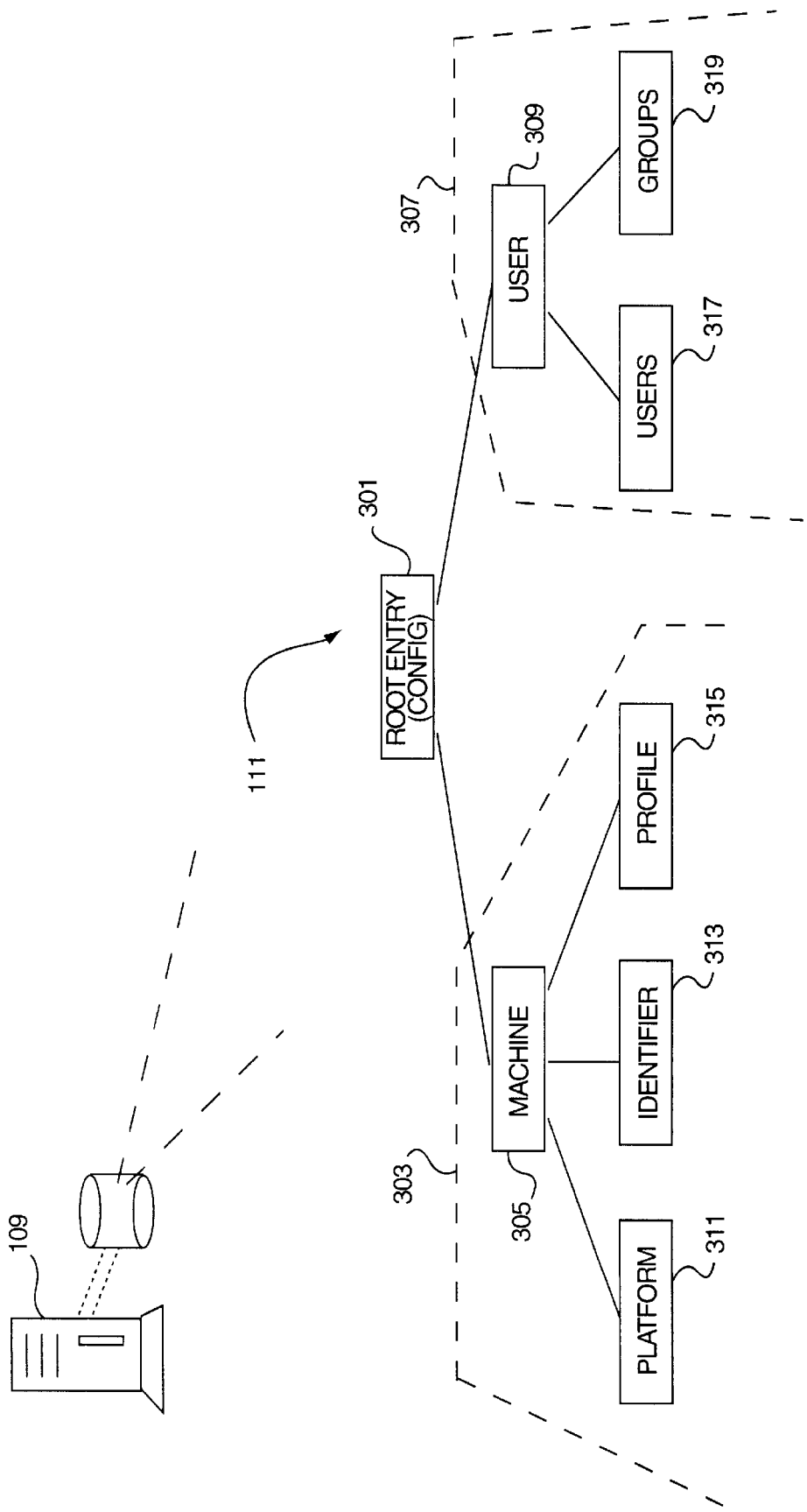
FIG. 3 is a block diagram showing a structure of a JSD server schema in accordance with one embodiment of the present invention.

The namespaces in the server schema component of the JSD are persistent storage spaces; that is, they remain after the client computer is turned off. In the described embodiment, there are two namespaces in the server schema: machine and user. FIG. 3 is a block diagram showing a structure of a JSD server schema in accordance with one embodiment of the present invention. It shows a server computer 109 and server schema 111 of FIG. 1 in greater detail. At the top of the n-way tree is a root entry 301, also representing a CONFIG namespace in the described embodiment. As mentioned, there are two namespaces in the server schema. Area 303 represents the machine namespace having a machine node 305. Area 307 represents the user namespace having a user node 309.

Machine namespace 303 is made up of three categories in the described embodiment. In other preferred embodiments, the machine namespace 303 may have more or fewer sub-categories depending on the platform and requirements of the network. The three categories or sub-ranges are platform 311 identifier 313, and profile 315. Under platform 311 are a number of entries that refer to specific computer manufacturers such Sun Microsystems and IBM Corporation.

Figure 4:
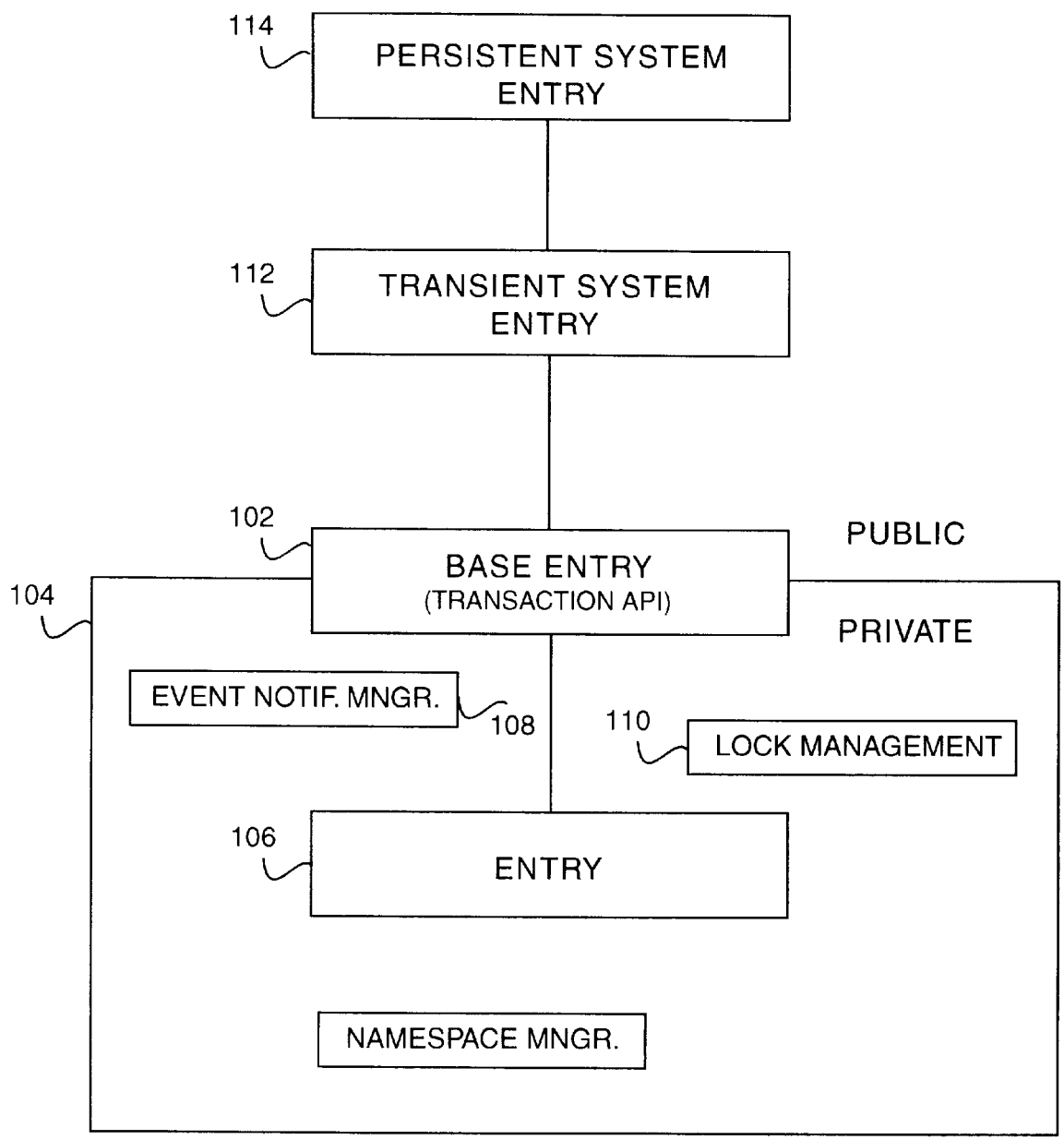
FIG. 4 is a block diagram showing a class hierarchy including classes and objects of transaction management in a configuration database in accordance with one embodiment of the present invention.

As mentioned earlier, the present invention also discloses a system for transaction management. In the described embodiment the transaction management has a transaction API that can be described as a container or a transaction management object that manipulates any type of abstract entry. An entry, i.e., a particular operation, can be placed into this transaction API or container. The transaction API is a way for an application to have a transaction performed and has two components: a lock API and an event queue, described in greater detail below. FIG. 4 is a block diagram showing a class hierarchy including classes and objects of transaction management in a configuration database in accordance with one embodiment of the present invention. A Base Entry class 402 is an abstract class in that is defines behavior of objects in it, but is not an actual object itself. It contains the core API, which in turn contains a transaction API, of the present invention. Part of Base Entry class 402 is private, shown in area 404, and the rest is public. All transactions in the configuration database are implemented in private Base Entry class 404. Thus, by keeping the transaction API portion of Base Entry class 402 private, the transaction management framework of the present invention can ensure that transactions are performed correctly in that transactions do not lock the root node of a sub-tree, as will be described in greater detail below.

Private Base Entry class 404 is essentially the transaction container mentioned above. An entry object 406 is "placed" in Base Entry class 402 for a transaction to take place. Examples of some instances of core API functions are event notification manager 408 and locking manager 410, described in greater detail below. In other preferred embodiments, the core API can include any number of transactions other than the ones described below. One important feature of the core API or transaction API is that it is part of private Base Entry class 404 and is therefore protected from public Base Entry sub-classes and destructive transactions (e.g. transactions that keep a hold on a lock). To complete the class hierarchy, also shown in FIG. 4 are System Entry class 412 and Persistent System Entry class 414. These two classes are outside private Base Entry class 404 and, thus, are part of the public Base Entry class. System Entry class 412 contains transient namespaces in the client schema as described above. In the described embodiment, these include DEVICE, INTERFACE, CONFIGURATION, ALIAS, and TEMP. In other preferred embodiments, System Entry class 412 can contain other namespaces depending on the needs of the network and its users. In the described embodiment, Persistent System Entry class 414 contains the only persistent namespace Software, as described above.

The lock API and management feature, shown as instance 410 of Entry class 406 in FIG. 4, in the JSD configuration database of the present invention is a two-phase locking process. In the first phase an entry is locked and in the second phase an update (or rollback, in case of a failure) is performed. The lock API, an entry in private transaction API, guarantees that no application will have a deadlock or hold on an entry (specifically, the root of a sub-tree) thereby locking out other transactions waiting on nodes in a sub-tree. For example, in the described embodiment, it will guarantee that there is no lock on the root entry of the client schema.

Figure 5:
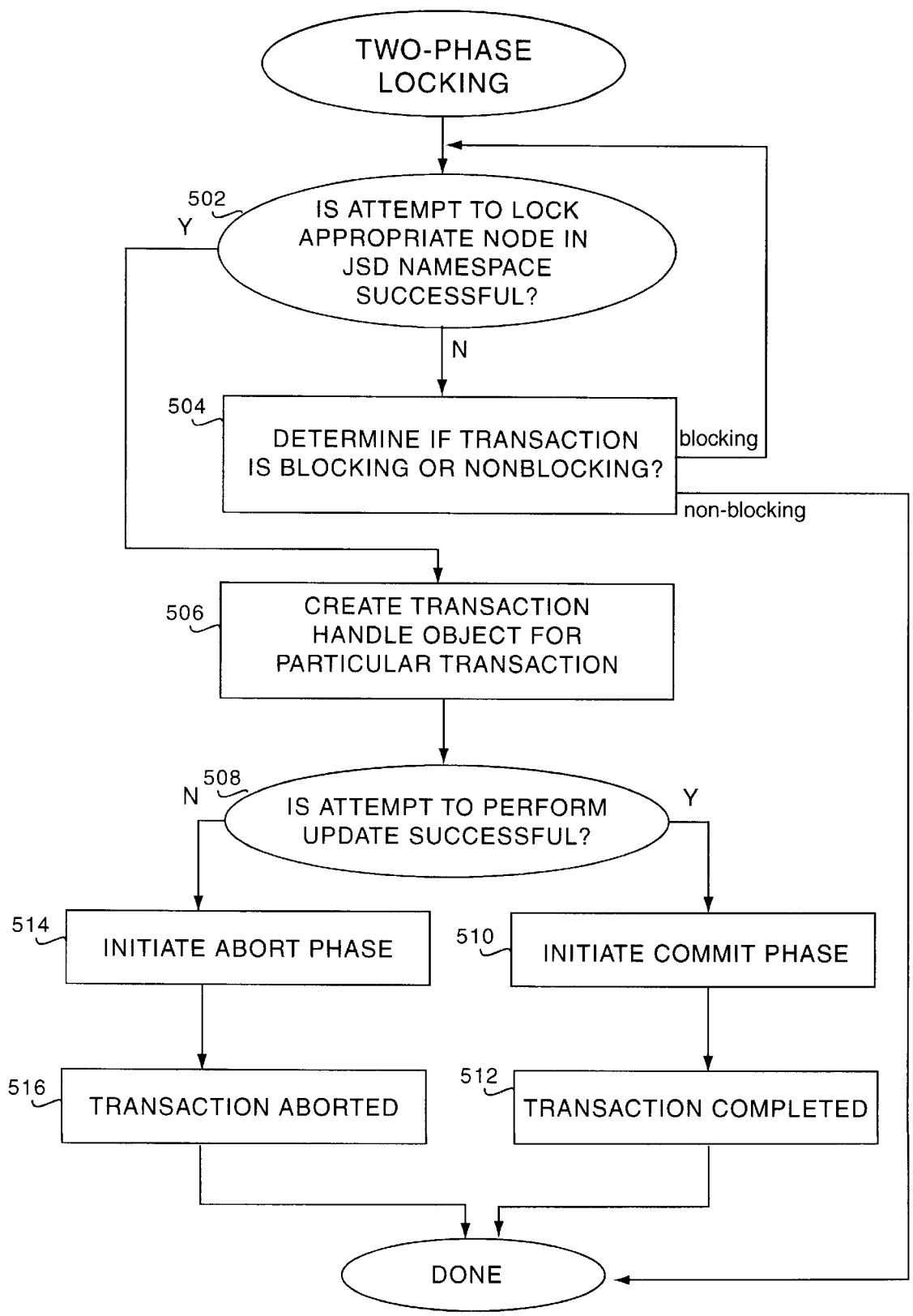
FIG. 5 is a flowchart showing a process of a two-phase lock of an entry in the configuration database in accordance with one embodiment of the present invention.

FIG. 5 is a flowchart showing a process of a two-phase lock of an entry in the configuration database in accordance with one embodiment of the present invention. At step 502 the application attempts to lock the appropriate root node of a sub-tree in a namespace. If a new node is being added to the schema, the parent node of the sub-tree being updated is locked while adding a new leaf node. If an existing leaf node is being updated, only that leaf node needs to be locked.

To help illustrate the different scenarios in a two-phase lock of the described embodiment, as well as other features of transaction management described below, the following is an example of a transaction and how the JSD schema is effected. As mentioned, the JSD schema (the client schema and the server schema) provides a database for storing and processing configuration information. One of the namespaces in the client schema is a Device namespace and another is the Interface namespace shown in FIG. 2. When a user adds or modifies the settings of a peripheral connected to the user's computer, these namespaces are typically effected. For example, when a user attaches a new printer to his computer, the Device and Interface namespaces are modified. When the printer is first attached, the operating system scans the peripheral bus connections and finds that there is a new peripheral connected to the bus. The operating system goes through a process of determining what type of device or hardware has been added and what type of driver will be needed.

The client makes an inquiry to the server JSD, informing the server JSD that there is a new hardware component, and providing information on the printer (e.g. a Hewlett-Packard LaserJet Series III). The server JSD sends configuration information relating to the printer to the client, which then updates the appropriate namespaces. In this case the Device and Interface namespaces are updated in the client JSD. By adding a new printer, new leaf nodes are inserted in the Device namespace and in the Interface namespace (the Interface entry is needed so software applications can search for a logical name for the printer, e.g., "Printer 4", that corresponds to the new printer).

Returning to step 502, the transaction, such as adding a new printer to a client, will attempt to lock the appropriate node in a sub-tree of the client JSD schema. If the attempt to lock the appropriate parent node or leaf node fails, control goes to step 504. At step 504 the system determines whether the transaction is a blocking or unblocking transaction. If the transaction is a blocking transaction it will wait until the lock is released by the current transaction. In this case, the transaction will "block" until it gets all the locks it needs to go further, and will typically do this until the entire transaction is complete. For example, the transaction will wait until it gets a lock on the Peripheral node in the Device namespace before it attempts to get a lock on the appropriate node (e.g. Printer) in the Interface namespace when a new computer is added. In the described embodiment, the transaction will get a lock on the desired node after the current transaction is done, at which point the current transaction will send an event notification to an event manager, described in greater detail below. The event manager will, in turn, inform all waiting threads waiting to get a lock on the sub-tree or individual entry that one of them can now proceed.

If the transaction is nonblocking it will attempt to perform other operations on other parts of the client schema while placing the thread that needs the locked entry in a queue and have it wait until the entry is free. Typically a transaction is non-blocked if there are real-time constraints and it is more efficient to continue doing other operations while a particular thread waits. In the described embodiment, the blocking or non-blocking determination is relevant if an attempt to lock an entry fails. As described above, either the entire transaction or a thread within a transaction waits until a lock is obtained. Thus, if the transaction is blocking, control returns to step 502 where the transaction attempts to acquire a lock on the desired entry, this time after waiting in a queue and being notified by an event manager, described below. If the transaction is non-blocking, the process is done since this indicates that the transaction does not want to wait to acquire a lock.

Once a lock on a desired entry is obtained thereby either locking a single entry or a sub-tree, a transaction handle is created for the transaction at step 506. This handle object is a unique identifier for the specific transaction that caused the lock. In other preferred embodiments, the transaction handle can be any type of identifier useful in determining which locks were caused by a specific transaction. The application proceeds with this transaction handle to perform updates on the JSD, specifically on the client JSD. A thread in the transaction is allowed to use the transaction handle, and can call to perform on update on an entry or insert a new entry, such as an entry for a new printer under the Devices namespace. In the described embodiment, each transaction is assigned a single transaction handle. This allows the system to determine, if necessary, that a particular update, modification, or insert, belongs to a particular transaction. A transaction handle object can take the form of a single integer in the described embodiment.

Once step 506 is reached, the first phase, i.e., the locking phase, in the two-phase commit of the locking API is completed. Control then goes to the second, commit/update, phase beginning with step 508 where the transaction performs the actual update. As described earlier, this can be a modification to an existing entry or leaf node or the insertion of a new leaf node, under a sub-tree of the client JSD schema. The transaction remains in step 508 until the update is completed. The locking mechanism determines whether there are any more updates to be performed as part of the transaction. If so, the updates are performed as described above. This is done for all the updates in the transaction. If the update is successfully completed, control goes to step 510.

At step 510 the update or updates making up the single transaction performed at step 508 are committed and a number of events occur. The locks acquired at step 502 are released. Thus, all entries are unlocked. This unlocking operation commits the updates made at step 508. In the described embodiment, the locks are released by examining the transaction handle for each lock. Only those locks that have the correct transaction handle are released, i.e. committed. In other preferred embodiments, other mechanisms for matching locks with a specific transaction can be used, such as maintaining a table of records, where each record represents a specific lock. Once the locks are released, as part of the commit phase of step 510, an asynchronous event notification is performed by posting the lock release to a centralized event manager. In other preferred embodiments, a notice that the transaction has been committed is broadcast to all threads waiting on the nodes that were locked without going through an event manager. In the described embodiment, the event manager is notified by a parent or root node of a sub-tree in the client JSD schema once a lock is released by posting the release to the event manager. In the described embodiment, the current active thread that is releasing the lock does not wait for acknowledgment from the event manager or from any of the threads waiting on the node just released. In other preferred embodiments, well-known synchronous methods of event notification can be used to achieve the same result. Any transactions waiting to obtain a lock, regardless of whether exclusive or shared, registers itself with the event manager. The central event manager can then determine which transactions are waiting for the node or nodes that were released. Once the event manager, shown in FIG. 1 as an instance 108 of an Entry 106, is informed that updates or insertions have been committed, it determines which transactions are to be notified. Once the commit has been performed, the transaction is completed at step 512.

Returning to step 508, if there is a failure and an update is not successful for any reason, control goes to step 514 where the transaction is aborted. This can happen, for example, if a user adds an incompatible printer or attempt to install an incompatible software program to the computer, or attempts to add a device already connected to his computer. This is shown in greater detail in FIG. 6. In the abort phase, the goal is to return the configuration database to a consistent state; that is, a state that existed before the transaction was initiated. As described in greater detail below, all locks relating to the update are released. In the described embodiment, this procedure involves using an event queue to undo updates already performed. In other preferred embodiments, other mechanisms can be used to keep track of previous activity such as a relational table or other type of database from which activity data can be stored in a chronological manner.

Once the abort phase is reached at step 514, the transaction is aborted at step 516 and the configuration database is restored to a state existing before the transaction was initiated, and the process is done. At this stage and after step 512 if the update is successful, the second phase of the locking process is complete, and the two-phase commit process is complete.

Figure 6:
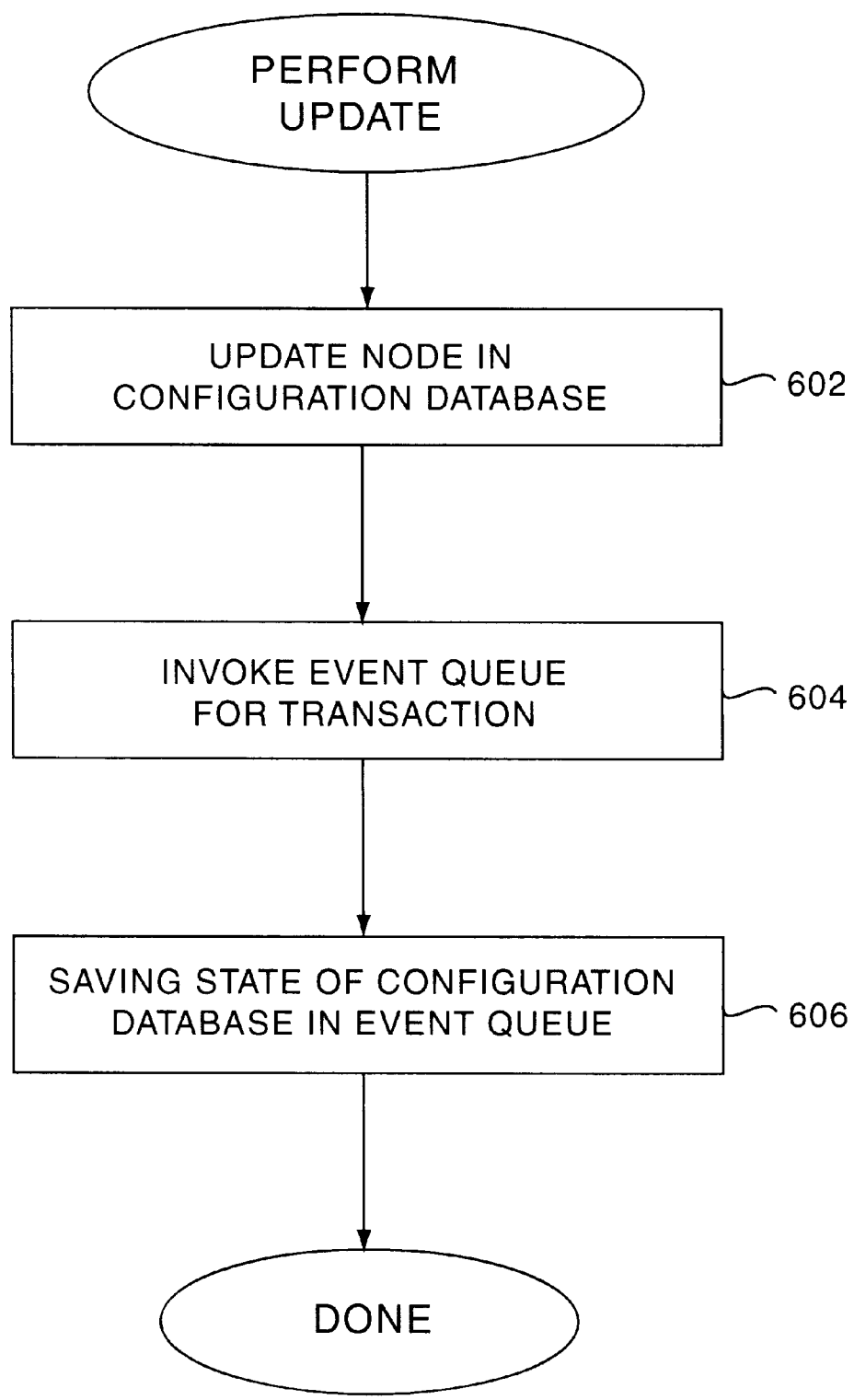
FIG. 6 is a flowchart showing in greater detail step 508 of FIG. 5 in which the update is performed in accordance with one embodiment of the present invention.

FIG. 6 is a flowchart showing in greater detail step 508 of FIG. 5 in which the update is performed in accordance with one embodiment of the present invention. In order for a transaction to be completed, one or more updates to the configuration database typically must be performed. The update can be changing the contents of an existing node, typically a leaf node, or adding a new node to a sub-tree. Thus, the first step is to perform the actual update to the JSD schema, whether it be the client or server JSD, as shown at step 602. At step 604 an event queue for the transaction is created when the transaction is instantiated or created. In the described embodiment, each transaction has its own event queue. An event queue can be identified by a transaction handle, which is also created when the transaction is instantiated. In other preferred embodiments, the event queue and transaction handle need not be created precisely when the transaction is instantiated, but at a time shortly thereafter, before updates in that transaction are performed. An event queue is described in greater detail below with respect to FIG. 8. Once an event queue for the transaction is available, all state data relating to a specific update that is necessary to undo the update if necessary is stored as an entry in the event queue at step 606. The state information saved in the event queue at step 606 reflects the state of the configuration database once the update has been performed. Thus, by examining the state data in each entry for a particular transaction, the network will now exactly what state of the database to revert to in the event of a failure. By doing this incrementally for each specific update performed in a transaction, the system can return the configuration database to its original state before the transaction started. This rollback operation is explained further with respect to FIGS. 7 and 8.

Figure 7:
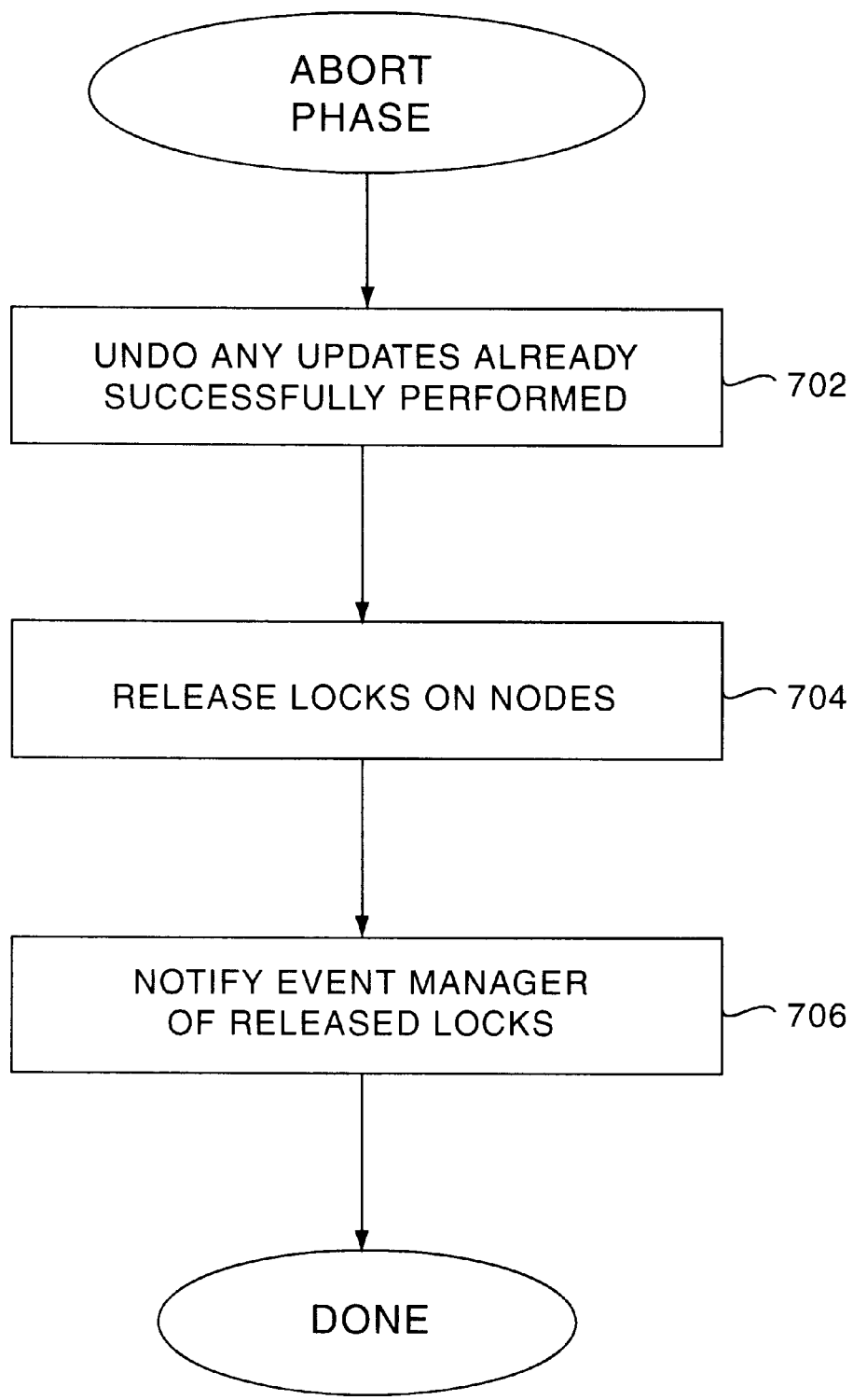
FIG. 7 is a flowchart showing in greater detail step 514 of FIG. 5 in which a transaction abort phase is shown in accordance with one embodiment of the present invention.

FIG. 7 is a flowchart showing in greater detail step 514 of FIG. 5 in which a transaction abort phase is shown in accordance with one embodiment of the present invention. At step 702 the system reads the event queue for the transaction and begins performing operations to revert the configuration database to the state described in the event queue entries. The top-most entry in the queue, i.e., the one entered most recently, is read first. The state data in that entry is examined and operations are performed on appropriate nodes in the database to put the database in the state indicated in that entry. This is done for each entry in the event queue until all updates related to the transaction have been wiped out. In other preferred embodiments, data structures such as relational tables or lists can be used to store and retrieve similar state data to accomplish the rollback function.

At step 704 the system releases any locks held by the transaction on any of the nodes. This is done the same way as described in step 510. The locks are identified by the transaction handle. Once they are identified, the system knows which locks to release. In step 510 the transaction handle was used to identify those updates that were to be committed. The last stage of the abort phase involves notifying the event manager that the locks have been released, as shown at step 514, so that threads waiting for those nodes can access them. At step 516 the transaction is aborted. At this stage the configuration database is in a correct state and does not reflect any activity from the failed transaction.

Figure 8:
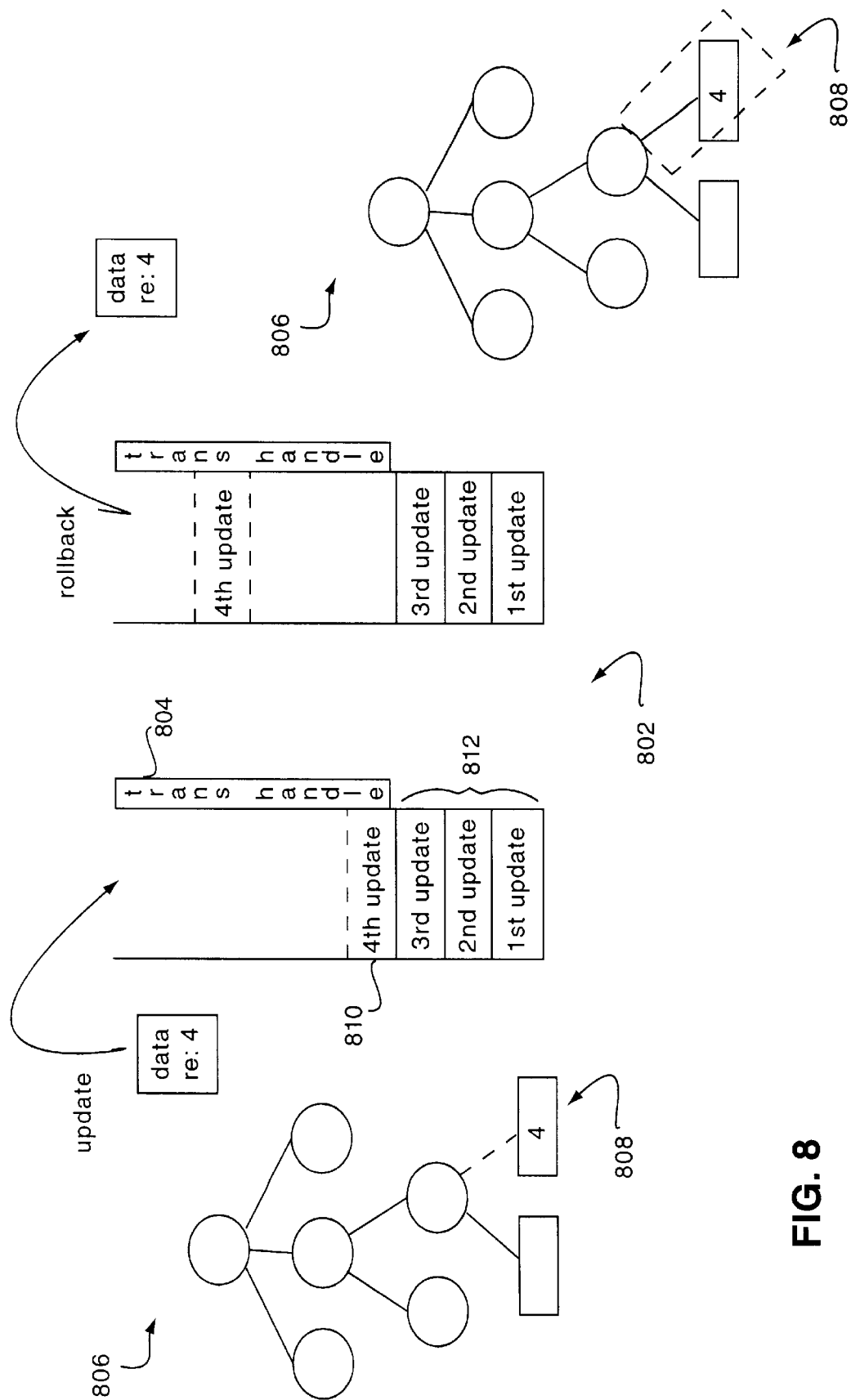
FIG. 8 is a block diagram showing an event queue in accordance with one embodiment of the present invention.

FIG. 8 is a block diagram showing an event queue in accordance with one embodiment of the present invention. An event queue 802 is shown twice to illustrate the update and rollback functions of the transaction management. The event queue is identified by a transaction handle 804 as described above. A sub-tree 806 is shown as being updated with the insertion of a new node 808. The insertion of the new node causes an entry 810 to be inserted in event queue 802 above the previous update entries 812. If an update fails an abort phase is initiated as described with respect to FIG. 6. For example, if the next update fails, update entry 810 is the first entry from the queue to be taken out and used to revert the state of sub-tree 806. Thus, as shown at 814, node 808 that was inserted in the last update is wiped out. This is then done for each of the entries 812, from top to bottom. As mentioned above, in other preferred embodiments data structures other than a first-in, last-out (FILO) stack can be to store state data relating to the configuration database, such as a linked list or relational table.

The present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should be remembered, however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general purpose computers may be used with programs written in accordance with the teachings herein, or, alternatively, it may be more convenient to construct a more specialized computer system to perform the required operations.

Figure 9:
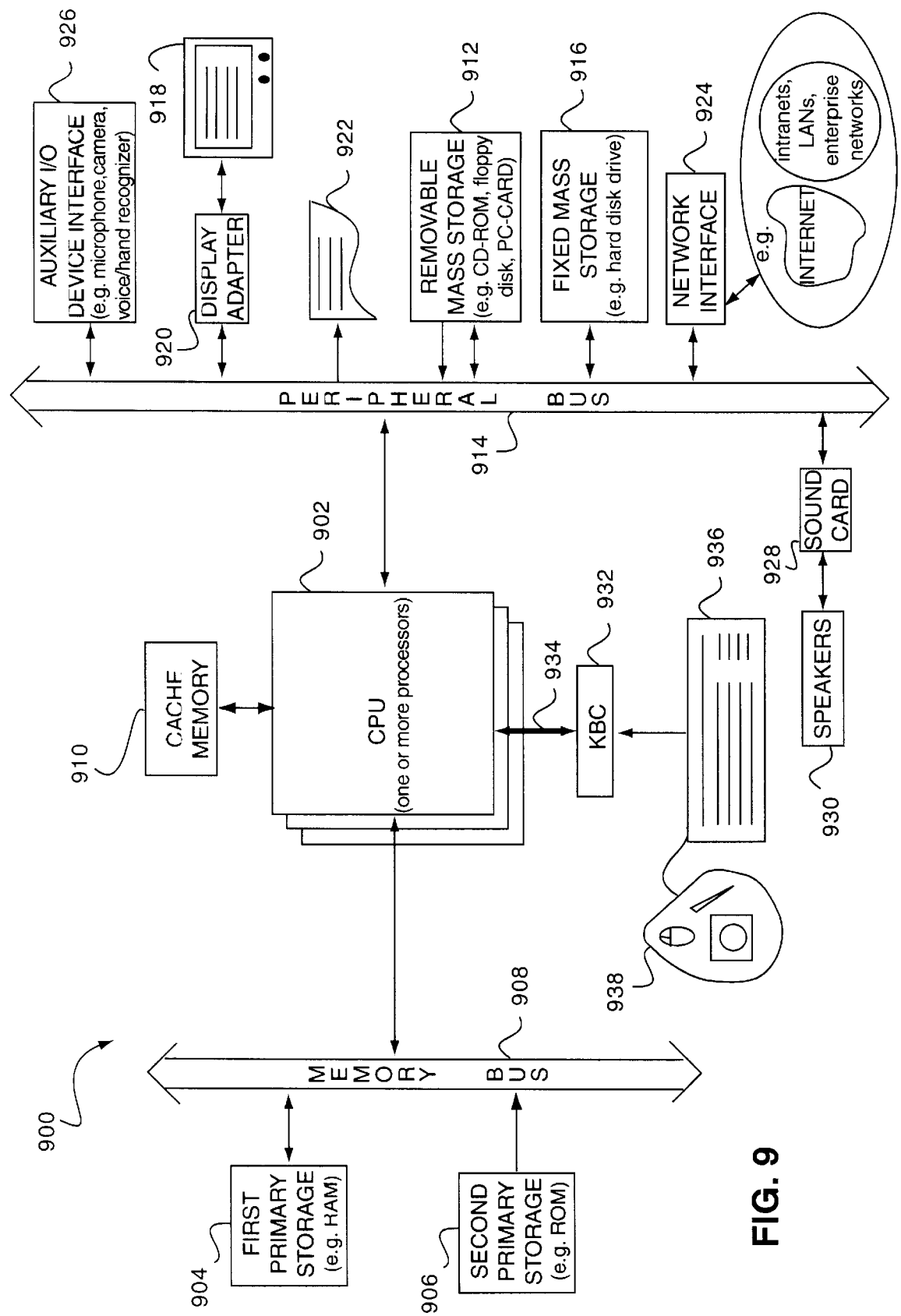
FIG. 9 is a block diagram of a typical computer system suitable for implementing an embodiment of the present invention.

FIG. 9 is a block diagram of a general purpose computer system 900 suitable for carrying out the processing in accordance with one embodiment of the present invention. FIG. 9 illustrates one embodiment of a general purpose computer system. Other computer system architectures and configurations can be used for carrying out the processing of the present invention. Computer system 900, made up of various subsystems described below, includes at least one microprocessor subsystem (also referred to as a central processing unit, or CPU) 902. That is, CPU 902 can be implemented by a single-chip processor or by multiple processors. CPU 902 is a general purpose digital processor which controls the operation of the computer system 900. Using instructions retrieved from memory, the CPU 902 controls the reception and manipulation of input data, and the output and display of data on output devices.

CPU 902 is coupled bi-directionally with a first primary storage 904, typically a random access memory (RAM), and uni-directionally with a second primary storage area 906, typically a read-only memory (ROM), via a memory bus 908. As is well known in the art, primary storage 904 can be used as a general storage area and as scratch-pad memory, and can also be used to store input data and processed data. It can also store programming instructions and data, in the form of a message store in addition to other data and instructions for processes operating on CPU 902, and is used typically used for fast transfer of data and instructions in a bi-directional manner over the memory bus 908. Also as well known in the art, primary storage 906 typically includes basic operating instructions, program code, data and objects used by the CPU 902 to perform its functions. Primary storage devices 904 and 906 may include any suitable computer-readable storage media, described below, depending on whether, for example, data access needs to be bi-directional or uni-directional. CPU 902 can also directly and very rapidly retrieve and store frequently needed data in a cache memory 910.

A removable mass storage device 912 provides additional data storage capacity for the computer system 900, and is coupled either bi-directionally or uni-directionally to CPU 902 via a peripheral bus 914. For example, a specific removable mass storage device commonly known as a CD-ROM typically passes data uni-directionally to the CPU 902, whereas a floppy disk can pass data bi-directionally to the CPU 902. Storage 912 may also include computer-readable media such as magnetic tape, flash memory, signals embodied on a carrier wave, PC-CARDS, portable mass storage devices, holographic storage devices, and other storage devices. A fixed mass storage 916 also provides additional data storage capacity and is coupled bi-directionally to CPU 902 via peripheral bus 914. The most common example of mass storage 916 is a hard disk drive. Generally, access to these media is slower than access to primary storages 904 and 906. Mass storage 912 and 916 generally store additional programming instructions, data, and the like that typically are not in active use by the CPU 902. It will be appreciated that the information retained within mass storage 912 and 916 may be incorporated, if needed, in standard fashion as part of primary storage 904 (e.g. RAM) as virtual memory.

In addition to providing CPU 902 access to storage subsystems, the peripheral bus 914 is used to provide access other subsystems and devices as well. In the described embodiment, these include a display monitor 918 and adapter 920, a printer device 922, a network interface 924, an auxiliary input/output device interface 926, a sound card 928 and speakers 930, and other subsystems as needed.

The network interface 924 allows CPU 902 to be coupled to another computer, computer network, or telecommunications network using a network connection as shown. Through the network interface 924, it is contemplated that the CPU 902 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 902 can be used to connect the computer system 900 to an external network and transfer data according to standard protocols. That is, method embodiments of the present invention may execute solely upon CPU 902, or may be performed across a network such as the Internet, intranet networks, or local area networks, in conjunction with a remote CPU that shares a portion of the processing. Additional mass storage devices (not shown) may also be connected to CPU 902 through network interface 924.

Auxiliary I/O device interface 926 represents general and customized interfaces that allow the CPU 902 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 902 is a keyboard controller 932 via a local bus 934 for receiving input from a keyboard 936 or a pointer device 938, and sending decoded symbols from the keyboard 936 or pointer device 938 to the CPU 902. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 908, peripheral bus 914, and local bus 934 are illustrative of any interconnection scheme serving to link the subsystems. For example, a local bus could be used to connect the CPU to fixed mass storage 916 and display adapter 920. The computer system shown in FIG. 9 is but an example of a computer system suitable for use with the invention. Other computer architectures having different configurations of subsystems may also be utilized to implement the client computer or server computer of the present invention. In another preferred embodiment of the present invention, the client computer is a network computer, or NC, which, in terms of functionality and storage capability, is between a fully self-sufficient "fat" client computer which could function as a stand-alone computer, and a dumb client which is almost completely dependent on a server or mainframe computer. In yet other preferred embodiments, the client schema can reside on non-computer devices such as smart cards and other smart appliances that can run the Java platform, in addition to computers with limited memory storage such as personal digital assistants (PDAs) and hand-held computers.

Although the foregoing invention has been described in some detail for purposes of clarity of understanding, it will be apparent that certain changes and modifications may be practiced within the scope of the appended claims. For example, the configuration database can be based on a platform other than Java, such as C++. In another example, the event queue can be implemented as a table or other type of data repository instead of a first-in last-out stack data structure. In another example, the two-phase locking can be implemented using other locking mechanisms that allow for rollback to an initial state. Furthermore, it should be noted that there are alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of updating a Java system configuration database having a client schema containing persistent and transient data, and a server schema containing persistent data, the method comprising:

creating an event queue, identified by a transaction handle, when the updating transaction is instantiated, for containing state data relating to the updating transaction;

obtaining a lock having an access type on a node, the access type determined according to whether one of a new node is being added to the Java system configuration database and an existing node is being modified;

retrieving a first set of persistent data containing a first plurality of data items describing client hardware and a second set of persistent data containing a second plurality of data items describing user configurations from the server schema, wherein the first set and the second set describe a client computer;

associating data items in the first set with data items in the second set thereby creating a plurality of data item correspondences describing a client computer;

modifying the client schema of the Java system configuration database with the plurality of data item correspondences; and committing the updating transaction by releasing the lock if the modification is successful.

2. A method as recited in claim 1 wherein obtaining a lock on a node further comprises determining whether the transaction attempting to cause the lock is a blocking or non-blocking transaction.

3. A method as recited in claim 2 wherein a blocking transaction waits until the lock on the node is released and a nonblocking transaction performs other operations while waiting for the lock on the node to be released.

4. A method as recited in claim 1 further comprising:

assigning an identifier to the transaction that caused the lock, wherein the identifier is a unique identifier and is used by a thread in the transaction to perform an operation on a node in the Java system configuration database.

5. A method as recited in claim 1 wherein modifying the configuration database further comprises:

adding a new node to the configuration database if data unrelated to an existing node is created by the transaction; and updating a previously added node if data created by the transaction is related to the previously added node.

6. A method as recited in claim 1 wherein committing the transaction further comprises informing any waiting transaction that the lock on the node is released.

7. A method as recited in claim 6 farther comprising sending an event notification to an event manager whereby the event manager informs any waiting transactions.

8. A method as recited in claim 7 fisher comprising registering with the event manager if a transaction is waiting for a node currently locked.

9. A method as recited in claim 1 wherein committing the transaction further comprises determining which locks to release by examining the transaction handle associated with each lock.

10. A method as recited in claim 1 wherein the event queue is comprised of a plurality of entries corresponding to specific updates, the plurality of entries arranged in the event queue such that the first entry placed in the queue is the last entry retrieved from the queue.

11. A method as recited in claim 1 further comprising:
aborting the transaction if the modification is unsuccessful;
reverting the Java system configuration database to an initial state by counteracting all updates in the transaction that were successfully performed;
releasing the lock on the node; and
notifying an event manager that the lock has been released.

12. A method of managing transactions in a Java system configuration database having a plurality of sub-trees and an initial state, the configuration database having a client schema containing persistent and transient data, and a server schema containing persistent data, the method comprising:
obtaining a lock on a node in a sub-tree in the server schema of the Java system configuration database, the lock having an access type determined according to whether one of a new node is being added to the Java system configuration database and an existing node is being modified;
retrieving a first set of persistent data containing a first plurality of data items describing client hardware and a second set of persistent data containing a second plurality of data items describing user configurations from the server schema, wherein the first sot and the second set describe a client computer;
associating data items in the first set with data items in the second sir thereby creating a plurality of data item correspondences describing a client computer;
modifying the client schema of the Java system configuration database with the plurality of data item correspondences;
updating an event repository to reflect modifications to the Java system configuration database;
notifying an event manager that the lock on the node has been released; and
reverting the Java system configuration database to the initial state by reading data from the event repository.

13. A computer readable medium containing programmed instructions arranged to update a Java system configuration database having a client schema containing persistent and transient data, and a server schema containing persistent data, the computer readable medium including programmed instructions for:
creating an event queue, identified by a transaction handle, when the updating transaction is instantiated, for containing state data relating to the updating transaction;
obtaining a lock having an access type on a node, the access type determined according to whether one of a new node is being added to the Java system configuration database and an existing node is being modified;
retrieving a first set of persistent data containing a first plurality of data items describing client hardware and a second set of persistent data containing a second plurality of data items describing user configurations from the serve schema, wherein the first set and the second set describe a client computer;
associating data items in the first set with data items in the second set thereby creating a plurality of data item correspondences describing a client computer;
modifying the client schema of the Java system configuration database with the plurality of data item correspondences; and
committing the updating transaction by releasing the lock if the modification is successful.

14. A computer readable medium containing programmed instructions arranged to manage transactions in a Java system configuration database having a plurality of sub-trees and an initial state, the configuration database having a client schema containing persistent and transient data, and a server schema containing persistent data, the computer readable medium including programmed instructions for:
obtaining a lock on a node in a sub-tree in the server schema of the Java system configuration database, the lock having an access type determined according to whether one of a new node is being added to the Java system configuration database and an existing node is being modified;
retrieving a first set of persistent data containing a first plurality of data items describing client hardware and a second set of persistent data containing a second plurality of data items describing user configurations from the server schema, wherein the first set and the second set describe a client computer;
associating data items in the first set with data items in the second set thereby creating a plurality of data item correspondences describing a client computer;
modifying the client schema of the Java system configuration database with the plurality of data item correspondences;
updating an event repository to reflect modifications to the Java system configuration database;
notifying an event manager that the lock on the node has been released; and
reverting the Java system configuration database to the initial state by reading data from the event repository.

15. A computer data signal embodied in a carrier wave and representing sequences of instructions arranged to update a Java system configuration database having a client schema containing persistent and transient data, and a server schema containing persistent data, the sequencce of instructions comprising:
creating an event queue, identified by a transaction handle, when the updating transaction is instantiated, for containing state data relating to the updating transaction;
obtaining a lock having an access type on a node, the access type determined according to whether one of a new node is being added to the Java system configuration database and an existing node is being modified;
retrieving a first set of persistent data containing a first plurality of data items describing client hardware and a second set of persistent data containing a second plurality of data items describing user configurations from the server schema, wherein the first set and the second set describe a client computer;
associating data items in the first set with data items in the second set thereby creating a plurality of data item correspondences describing a client computer;
modifying the client schema of the Java system configuration database with the plurality of data item correspondences; and committing the updating transaction by releasing the lock if the modification is successful.

16. A computer data signal embodied in a carrier wave and representing sequences of instructions arranged to manage transactions in a Java system configuration database having a plurality of sub-trees and an initial state, the configuration database having a client schema containing persistent and transient data, and a server schema containing persistent data, the sequence of instructions comprising:

obtaining a lock on a node in a sub-tree in the server schema of the Java system configuration database, the lock having an access type determined according to whether one of a new node is being added to the Java system configuration database and an existing node is being modified;

retrieving a first set of persistent data containing a first plurality of data items describing client hardware and a second set of persistent data containing a second plurality of data items describing user configurations from the server schema, wherein the first set and the second set describe a client computer;

associating data items in the first set with data items in the second set thereby creating a plurality of data item correspondences describing a client computer;

modifying the client schema of the Java system configuration database with the plurality of data item correspondences;

updating an event repository to reflect modifications to the Java system configuration database;

notifying an event manager that the lock on the node has been released; and reverting the Java system configuration database to the initial state by reading data from the event repository.

* * * * *

UNITED STATES PATENT AND TRADEMARK OFFICE
CERTIFICATE OF CORRECTION

PATENT NO. : 6,115,715
DATED : September 5, 2000
INVENTOR(S) : Bernard A. Traversat, Tom Saulpaugh, Jeffrey A. Schmidt, and Gregory L. Slaughter It is certified that error appears in the above-identified patent and that said Letters Patent are hereby corrected as shown below:

In the Claims;

Column 15 line 34, please replace "sot" with --set--.

Column 15 line 37, please replace "sir" with --set--.

Column 16 line 1, please replace "serve" with --server--.

Signed and Sealed this

Eighth Day of May, 2001

*Attest:*

NICHOLAS P. GODICI

*Attesting Officer*  *Acting Director of the United States Patent and Trademark Office*